INVENTOR
KNUD VAGN VALBJØRN

INVENTOR
KNUD VAGN VALBJØRN

United States Patent Office 3,454,213
Patented July 8, 1969

3,454,213
PEDESTAL-SUPPORTED ENCAPSULATED REFRIGERANT MOTOR-COMPRESSOR UNIT
Knud Vagn Valbjørn, Augustenhof, Nordborg, Denmark, assignor to Danfoss A/S, Nordborg, Denmark, a company of Denmark
Filed Oct. 12, 1967, Ser. No. 674,815
Claims priority, application Germany, Oct. 15, 1966, D 51,322
Int. Cl. F04b 35/04; F25b 31/02
U.S. Cl. 230—58     18 Claims

ABSTRACT OF THE DISCLOSURE

An encapsulated motor-compressor unit in a hermetic capsule having a single rigid, elongated stationary pedestal supporting the refrigerant compressor and the electric driving compressor. A resilient mount resiliently supports the pedestal upstanding in the capsule so that the motor-compressor is resiliently mounted within the capsule. The mount has springs controlling and damping its radial and axial movement.

---

Figure 1:
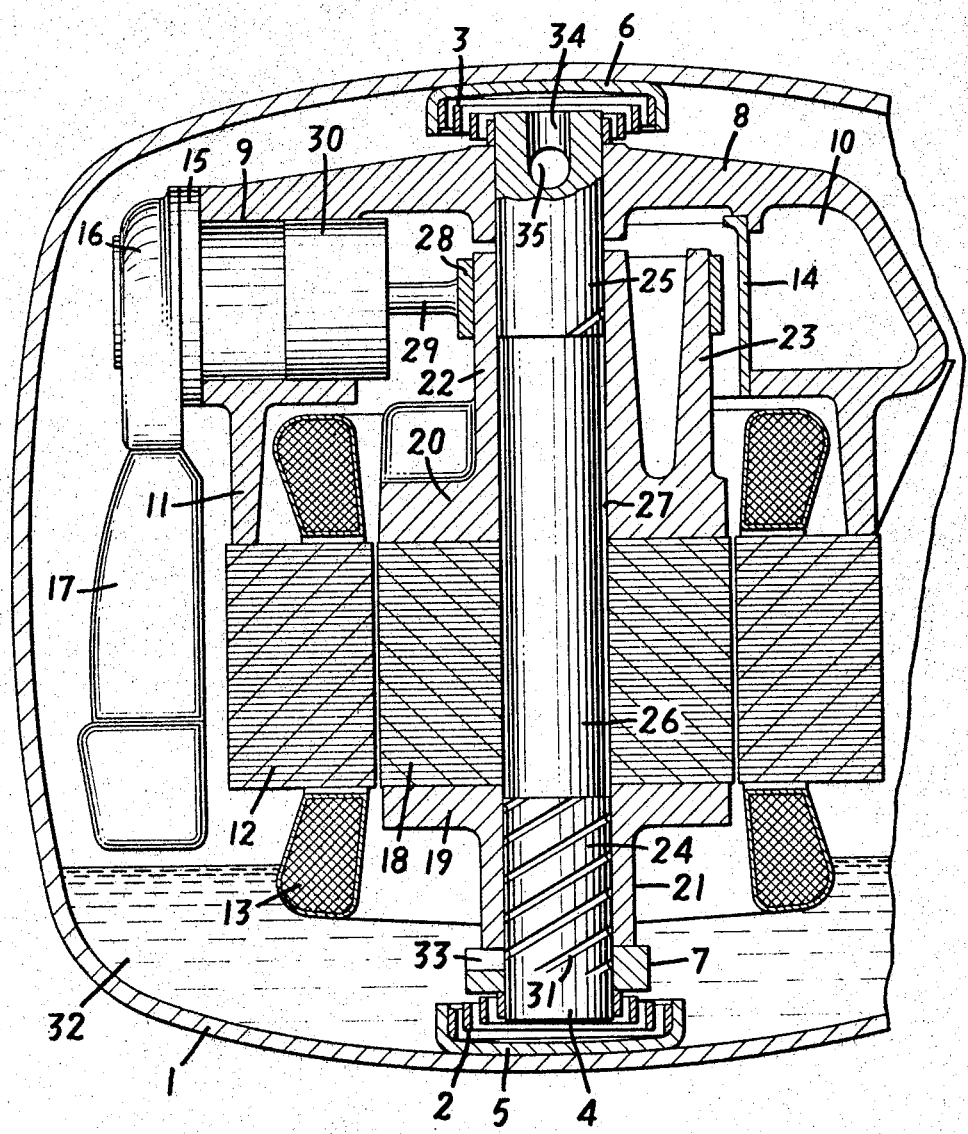

This invention relates generally to an encapsulated motor-compressor, and more particularly to a hermetically sealed refrigerant motor-compressor unit.

Motor-compressors of conventional design make use of a support element or suspension mount which is resiliently suspended in the housing or capsule and on which the stator and the compressor are mounted. The mount is also provided with a bearing supporting the crankshaft of the drive motor. This type of construction complicates the assembly of the components and their suspension in the housing, necessitating at least three suspension mount springs.

The present invention has for a principal object to provide a motor-compressor easy to assemble, comprising simpler components and, if necessary, is capable of being supported on the housing or capsule internally thereof with fewer springs than heretofore.

According to the invention this object is achieved by means of a preferably vertical, elongated, support pedestal or standard which is supported on the housing or capsule and on which a rotor, stator and compressor are mounted and/or supported. The support pedestal is ideally suited for mounting the main parts of the motor-compressor because these parts need only be slipped on to the pedestal or standard and, if they are intended as stationary parts, only need to be attached thereto. The pedestal may serve as a bearing journal either directly or after slipping on a simple bushing. In the simplest case the pedestal may be resiliently supported in the capsule at either end by means of a spring in each case, i.e. two springs in all. Another advantage is the fact that the pedestal construction is very simple and it is easy to manufacture it with great accuracy.

Since the whole length of the pedestal can be exploited for functional purposes, particularly safe support can be obtained for the rotor if the latter is supported on the pedestal at two points, axially displaced relative to one another. In particular, an inner rotor can develop the pedestal over the major part of its axial length in which case the pedestal is of reduced diameter along an intermediate part of its length, so that the two bearing areas are axially separated from one another.

There is also the possibility of varying the construction by mounting the stator on the pedestal and supporting a rotor thereon outwardly of the stator so that the advantages of such an outer rotor, particularly its high inertia, can be made use of. Furthermore, the pedestal may form part of an oil-conveying system. For example, the lower portion thereof may project into the oil sump and can be provided with helical grooves directly on the pedestal or on a bushing, in the manner of an oil pump. In another embodiment a conical element projects into the oil sump of the capsule and is attached to the rotor, and an oil duct communicating with the pedestal extends from the peripheral region of this conical element. An oil duct extending to the upper rotor bearing is provided inside the pedestal, for example, in that the pedestal is provided with a longitudinal bore or it has a longitudinal groove enclosed by the rotor or the stator.

A crankpin is eccentrically fitted to the pedestal. This provides additional simplification of the construction because the crankpin can serve simultaneously as one of the rotor bearings.

The stationary pedestal may also be utilized for conducting suction refrigerant gas and, in particular, a gas suction port may be provided in the upper end face of the pedestal where it is well screened from oil which might otherwise be entrained in the gaseous refrigerant.

In one embodiment a component, which is a casting, comprises the compressor cylinder and the silencer chambers and is attached to the pedestal on the side of the crankpin away from the rotor. The mounting area needed on the pedestal for this component therefore occupies only a small part of its axial length, so that the entire remaining length of the pedestal remains available for supporting and mounting a stator and a rotor thereon. Moreover, this construction enables the casting component, comprising the cylinder and the silencer chambers, to be cast in the shape of a pot with use of a dead core. The cavities of the casting which form the silencer chambers can be closed by means of a cover or an insert. A construction of such simplicity is not feasible in known motor-compressors comprising a rotor supported at two points.

The pedestal may assume even other functions. For example, an electrical cable may be led through the pedestal if an inner stator is used. Furthermore, the construction proposed by the present invention also permits a construction whereby, if an outer rotor is employed, a suction port arranged in the region of the crankpin, as well as a peripherally situated exit port can be provided. Due to centrifugal force, the aspired refrigerant gas is led past the stationary stator coil and cools it.

Still another advantage gained by the present invention is if at least one shading ring of the rotor serves also as the rotor hub. In that case the material used for the shading ring is at the same time the bearing metal, and the bearing surface can be machined at the same time as the rotor is turned.

Figure 2:
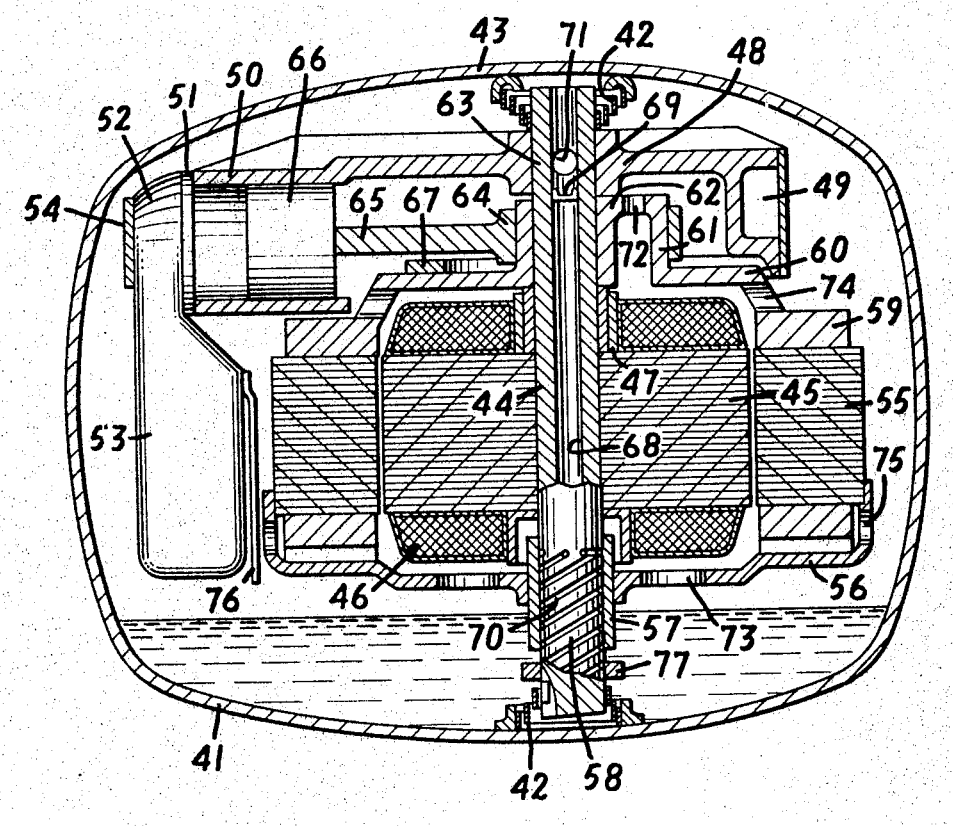
Figure 3:
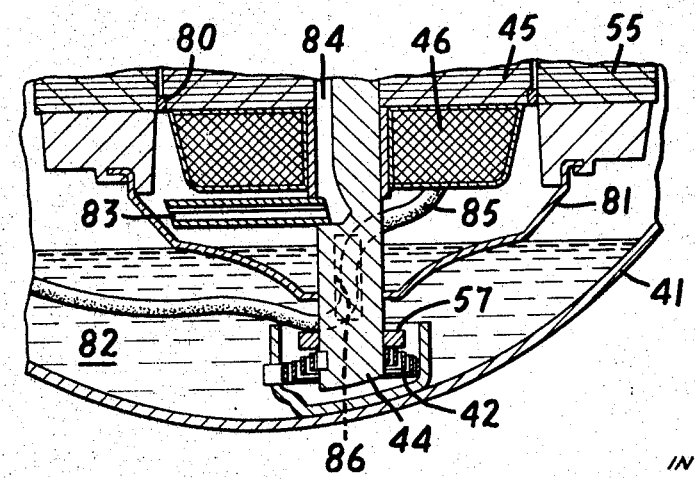

Other features and advantages of the hermetically encapsulated motor-compressor unit according to the present invention will be better understood as described in the following specification and appended claims, in conjunction with the following drawings in which:

FIG. 1 is a vertical longitudinal section view of a motor-compressor unit provided with an inner rotor, FIG. 2 is a vertical longitudinal sectional view of a second embodiment of a unit according to FIG. 1 except with an outer rotor, and FIG. 3 is a fragmentary sectional view of a modification of the lower part of the embodiment of FIG. 2.

As illustrated in FIG. 1 a refrigerant motor-compresor unit comprises a hermetic capsule 1 in which two suspension mounts comprising springs 2, 3 mount a substantially stationary shaft or pedestal 4 held in the housing by means of the two conical spiral springs 2 and 3. The suspension systems and mounts have springs capable of damping radial as well as axial deflections of the pedestal 4. Each spring is arranged in a cupped element 5 and 6 respectively and supports a part positively connected to the pedestal 4. The lower spring 2 supports a stop ring or collar 7 fitted on the pedestal, while the upper spring supports component or casting 8 in which a cylinder 9 and cavities 10, constituting silencer chambers, are provided. The casting is provided with extensions 11 which carry a stator 12 with a coil 13. The stationary parts of the motor-compressor further comprise a cover plate 14 closing the silencer cavities 10, a valve plate 15 on the cylinder and a cylinder head 16. The cylinder head communicates with a pressure silencer chamber 17. The cup-like shape of the casting 8 enables the various components thereof to be cast in one piece, with a dead core. The dead core can easily be removed, after casting, through the large inner space.

An electrical motor rotor 18 is provided with an injection-molded metal cage of which only two shading rings 19 and 20 appear in the drawing. The lower shading ring 19 has an extension in the form of a sleeve-like hub 21. The upper shading ring 20 has an extension in the form of a sleeve-like hub 22 and also extends into a crankpin configuration 23. The shading ring serves as a bearing at the same time. The hubs 21, 22 run on bearing sections or journals 24 and 25 of the pedestal 4. The intervening or intermediate section 26 of the pedestal is of reduced diameter, so that an annular space 27 is defined between the rotor and the pedestal. The crankpin 23 engages a crank bearing 28, which is operatively associated with a piston 30 by means of a connecting rod 29.

On the lower bearing section 24 of the pedestal 4 a helical groove 31 is provided which, in cooperation with the hub 21, acts as an oil pump. Oil is supplied from a sump 32 through a port 33 in the stop ring 7 and lubricates the bearings 21, 23 directly, then is taken through the annular gap or space 27 to the bearing and journal 25, 22 and, from there, in the usual way to the cylinder.

The upper end of the pedestal has a bore 34 which serves as a suction port for the refrigerant gas present in the housing or capsule 1. A transverse bore 35 leads from this point into one of the suction silencer cavities or chambers 10.

The assembly of a motor-compressor unit of this type is very simple. First, the casting 8 with the stator and the piston 30 inserted in the cylinder is attached to the pedestal 4. Then the rotor 18 is slipped on from below in such a way that the crankpin 23 engages the crank bearing 28. The rotor is finally secured in an axial position by slipping on the stop ring 7. Now the springs 2 and 3 with their mount cups 5 and 6 are slipped over the ends of the pedestal and the whole assembly is placed in the capsule 1. The customary accessories such as electrical supply cables with lead-through, suction ports, pressure pipes with a pressure port etc. have not been shown for clarity's sake.

In the embodiment of FIG. 2 the basic concept is similar to that of the embodiment illustrated in FIG. 1. The difference being that the compressor is provided with an inner stator and an outer rotor. Again a stationary pedestal 44 is supported in a housing or capsule 41 by means of two springs 42, 43. In the central part the pedestal supports a stator 45 with a coil 46 and a spacing ring 47. At the upper end is mounted a casting 48 which comprises suction silencer cavities or chambers 49 and a cylinder 50. Together with the cylinder, a valve plate 51 and a cylinder head 52 with pressure silencer chambers 53 are fitted and secured by means of a strap 54 which also seals off the silencer cavities 49.

A rotor 55 is disposed outwardly of the stator and is supported at its lower end by means of a plate 56. The plate is provided with a sleeve-like hub 57 which engages a lower bearing or journal section 58 of the pedestal 44. On top of the rotor is provided a shading ring 59 with an extension 60. The extension terminates in a crankpin 61 and a sleeve-like hub 62. The hub engages a second bearing or journal section 63 of the pedestal or standard 44. The crankpin engages a crank 64 which drives the piston 66 via a connecting rod 65. Finally, a balancing weight 67 is provided on the extension 60 for dynamic balancing.

The pedestal 44 has a longitudinal bore 68 closed at the lower end and subdivided by a gasket 69. The lower part of the bore 68 is an oil duct, the oil-conveying device is again a helical groove 70, which functions as a pump in conjunction with the hub 57. The upper end of the bore 68 is a suction duct for the refrigerant gas and communicates through a transverse bore 71 with the intake silencer cavities 49.

On the upper and lower faces of the rotor suction ports 72 and 73 are provided which aspire the gas from the interior of the housing. The gas is ejected through peripherally provided exit ports 74, 75 due to centrifugal force. The gas thus conveyed cools the coil 46 of the stator 45. A guard plate 76 ensures that the gas thus conveyed cannot immediately contact the hot gas pressure silencer 53. At a lower end portion of the pedestal is fitted a support ring 77.

This compressor can also be assembled very simply. The stator 45 with spacing ring 47 is fitted to the pedestal. Then the component 48 is united with the cylinder 46 and the rotor 55, and this assembly is slipped on the pedestal from above. The casting 48 is postively connected to the pedestal. Finally, the plate 56 and the support ring 77 are slipped over the lower end. The plate is attached to the rotor 55 and the ring to the standard or pedestal 44.

FIG. 3 is a modification of the embodiment of FIG. 2. Therefore, the same reference symbols have been used for identical parts as far as possible. This embodiment does not feature a lower rotor bearing on the pedestal 44. Instead of such a bearing, a bearing ring 80 is provided circumferentially of the stator 45, and the rotor 55 runs on this ring. A conical plate 81 is attached to the lower face of the rotor 55 and dips into the oil in a sump 82. A stationary tube 83 is attached to the pedestal 44 and has an open end which extends to a point near the periphery of the conical plate 81. Oil conveyed along the conical surface can thus proceed through the duct 83 into a longitudinal groove 84 of the pedestal 44, covered by the stator 45, and finally reaches the points of lubrication. An electrical lead or cable 85 for the stator extends through an aperture 86 of the pedestal 44 which is situated in the region of the narrowest point of the plate 81 or of a bearing for the rotor 55.

While preferred embodiments of the invention have been shown and described it will be understood that many modifications and changes can be made within the true spirit and scope of the invention.

What I claim and desire to be secured by Letters Patent is:

1. In an encapsulated refrigerant motor-compressor unit, a capsule, a motor-compressor in said capsule comprising a single, rigid, elongated vertically disposed stationary pedestal, a refrigerant compressor supported on said pedestal and an electrical motor having a part thereof supported on said pedestal and operative for driving said compressor, and mount means resiliently supporting said pedestal upstanding in said capsule thereby resiliently mounting said motor-compressor within said capsule.

2. In an encapsulated refrigerant mator-compressor unit according to claim 1, in which said mount means comprises a suspension mount on a lower end of said pedestal and a suspension mount on an upper end of said pedestal, the upper and lower mounts holding said pedestal upstanding in said capsule.

3. In an encapsulated refrigerant motor-compressor unit according to claim 2, in which said upper and lower suspension mounts each comprises a respective conical spring, said pedestal extending between the respective upper and lower mount springs.

4. In an encapsulated refrigerant motor-compressor unit according to claim 1, in which said electrical motor comprises a rotor, means supporting said rotor on said pedestal at two axially spaced regions of said pedestal, and a stator of said rotor.

5. In an encapsulated refrigerant motor-compressor unit according to claim 4, in which said pedestal has a portion intermediate said axially spaced regions, said means supporting said rotor comprising bearing means circumferentially of said axially spaced regions on said pedestal, an oil sump in said capsule, a lower one of said bearing means extending into said sump, a lower one of said regions on said pedestal comprising grooves cooperative with said lower one of said bearing means for pumping oil from said sump for lubricating said bearing means and said compressor.

6. In an encapsulated refrigerant motor-compressor unit according to claim 1, including means cooperative with said pedestal jointly therewith defining an oil pump on a lower end of said pedestal for lubricating said compressor, and said capsule having a lubricating oil sump within which said oil pump is disposed.

7. In an encapsulated refrigerant motor-compressor unit according to claim 6, including means supporting said compressor on said pedestal and means supporting said motor on said pedestal, and in which said pedestal defines lubricating fluid flow paths in conjunction with said means supporting said compressor and said means supporting said motor on said pedestal.

8. In an encapsulated refrigerant motor-compressor unit according to claim 6, in which said means defining said pump jointly with said pedestal comprises a conical element defining a duct for taking a suction from said oil sump, and said pedestal providing oil flow paths for lubricating said compressor.

9. In an encapsulated refrigerant motor-compressor unit according to claim 1, including bearing means on said pedestal supporting said compressor and said motor, one of said bearing means supporting said motor comprising crankpin means eccentric to said pedestal, and means connected to said crankpin means for driving said compressor from said motor.

10. In an encapsulated refrigerant motor-compressor unit according to claim 1, in which said pedestal comprises and defines passageways and ports for supplying refrigerant in a gaseous condition to said compressor.

11. In an encapsulated refrigerant motor-compressor unit according to claim 10, including suction and discharge silencers on suction and discharge sides of said compressor in communication with said compressor.

12. In an encapsulated refrigerant motor-compressor unit according to claim 11, in which said compressor comprises a cylinder, and said motor-compressor comprising means integrally defining said cylinder and suction and discharge silencers.

13. In an encapsulated refrigerant motor-compressor unit according to claim 1, in which said capsule comprises a rotor mounted on said pedestal and a stator circumferentially of said rotor, means comprising bearing means connecting said rotor to said compressor for driving said compressor.

14. In an encapsulated refrigerant motor-compressor unit according to claim 1, in which said motor comprises a stator mounted on said pedestal and a rotor circumferentially of said stator, means comprising bearing means connecting said rotor to said compressor for driving said compressor therefrom.

15. In an encapsulated refrigerant motor-compressor unit according to claim 14, in which said pedestal comprises electrical conductor passageways and an electrical conductor extending therethrough connected to said motor.

16. In an encapsulated refrigerant motor-compressor unit according to claim 1, in which said pedestal defines a suction duct in communication with said compressor, and means supporting said motor having openings for delivery of gas refrigerant outwardly of said motor-compressor centrifugally and into said capsule for said compressor to take a suction therefrom, and the last mentioned openings being disposed relative to said motor to allow gas refrigerant to flow along paths cooling said motor.

17. In an encapsulated refrigerant motor-compressor unit according to claim 1, in which said motor comprises a rotor, a shading ring for said rotor defining a rotor hub.

18. In an encapsulated refrigerant motor-compressor unit according to claim 1, in which said capsule comprises a sump for containing therein lubricating fluid, said pedestal having a lower end portion extending into said sump and lunbricating fluid contained therein, means on said pedestal lower end portion cooperative therewith defining an oil pump for pumping lublicating fluid from said sump along said pedestal for lubricating said compressor.

References Cited
UNITED STATES PATENTS

| | | | |
|---|---|---|---|
| 2,178,811 | 11/1939 | Sateren | 230—58 |
| 2,801,045 | 7/1957 | Philipp | 230—235 |
| 2,894,678 | 7/1959 | Hintze | 230—58 |

ROBERT M. WALKER, *Primary Examiner.*

U.S. Cl. X.R.

230—235